United States Patent
Shim et al.

(10) Patent No.: US 10,447,188 B2
(45) Date of Patent: Oct. 15, 2019

(54) BRUSHLESS DIRECT CURRENT ELECTRIC MOTOR DRIVING CONTROL METHOD AND SYSTEM OF ELECTRICAL WATER PUMP

(71) Applicants: Hyundai Motor Company, Seoul (KR); Kia Motors Corporation, Seoul (KR); Myung Hwa Ind. Co., Ltd., Seoul (KR)

(72) Inventors: Dong Soo Shim, Chungcheongnam-do (KR); Yeon Ho Kim, Gyeonggi-do (KR); Byoung Hoon Choi, Gyeonggi-do (KR); Jae Shin Yi, Gyeonggi-do (KR); Hyeong Geun Song, Gyeonggi-do (KR); Geun Oh Dong, Gyeonggi-do (KR)

(73) Assignees: Hyundai Motor Company, Seoul (KR); Kia Motors Corporation, Seoul (KR); Myung Hwa Ind. Co., Ltd., Seoul (KR)

( * ) Notice: Subject to any disclaimer, the term of this patent is extended or adjusted under 35 U.S.C. 154(b) by 0 days.

(21) Appl. No.: 15/836,522

(22) Filed: Dec. 8, 2017

(65) Prior Publication Data
US 2018/0167005 A1   Jun. 14, 2018

(30) Foreign Application Priority Data

Dec. 14, 2016 (KR) .......................... 10-2016-0170107

(51) Int. Cl.
*H02P 21/24* (2016.01)
*H02P 7/00* (2016.01)
(Continued)

(52) U.S. Cl.
CPC ............ *H02P 7/0094* (2013.01); *F04B 17/03* (2013.01); *F04B 49/06* (2013.01); *F04B 49/20* (2013.01);
(Continued)

(58) Field of Classification Search
CPC .............. F04B 17/03; F04B 2203/0203; F04B 2203/0207; F04B 2203/0209; F04B 49/20;
(Continued)

(56) References Cited

U.S. PATENT DOCUMENTS

2010/0327786 A1* 12/2010 Aoki .................. G01D 5/24452
318/400.04
2011/0279070 A1* 11/2011 Tanaka .................... H02P 6/181
318/400.1
(Continued)

FOREIGN PATENT DOCUMENTS

JP    2005-065410 A    3/2005
JP    2005-168797 A    6/2005
(Continued)

*Primary Examiner* — Muhammad S Islam
(74) *Attorney, Agent, or Firm* — Mintz Levin Cohn Ferris Glovsky and Popeo, P.C.; Peter F. Corless

(57) ABSTRACT

A method and system of controlling driving of a brushless DC electric motor (BLDC) of an electric water pump are provided. The method includes estimating an initial position of a rotor using a magnitude of a current detected in a three-phase coil wound on a stator and converting a current magnitude that reflects a rotational angle of the rotor with respect to the initial position into two direct currents based on the three-phase current. The converted direct currents are output and a rotational angle, a speed, a flux and a torque of the rotor are acquired based on values of the three-phase current, a voltage generated according to flow of the three-phase current, a predetermined coil resistance, and an inductance input. A speed of the motor is then adjusted based on the acquired rotational angle, speed, flux, and torque of the rotor.

9 Claims, 3 Drawing Sheets

(51) Int. Cl.
*F04B 17/03* (2006.01)
*H02P 7/34* (2016.01)
*F04B 49/06* (2006.01)
*F04B 49/20* (2006.01)

(52) U.S. Cl.
CPC ............... *H02P 7/34* (2013.01); *H02P 21/24* (2016.02); *F04B 2203/0201* (2013.01); *F04B 2203/0203* (2013.01); *F04B 2203/0207* (2013.01); *F04B 2203/0209* (2013.01); *F05B 2270/101* (2013.01)

(58) Field of Classification Search
CPC ... F05B 2270/101; H02P 21/24; H02P 7/0094
See application file for complete search history.

(56) References Cited

U.S. PATENT DOCUMENTS

| 2015/0207447 A1* | 7/2015 | Sato | H02P 1/46 |
| | | | 318/400.11 |
| 2017/0194885 A1* | 7/2017 | Rondot | H02P 6/08 |

FOREIGN PATENT DOCUMENTS

| JP | 2013-220007 A | 10/2013 |
| KR | 10-2001-0011153 A | 2/2001 |
| KR | 2004-0034827 A | 3/2005 |
| KR | 2011-0097221 A | 8/2011 |
| KR | 10-1234778 B1 | 2/2013 |
| KR | 10-2013-0106505 A | 9/2013 |

\* cited by examiner

RELATED ART

BRUSHLESS DIRECT CURRENT ELECTRIC MOTOR DRIVING CONTROL METHOD AND SYSTEM OF ELECTRICAL WATER PUMP

CROSS-REFERENCE TO RELATED APPLICATION

This application claims under 35 U.S.C. § 119(a) the benefit of priority to Korean Patent Application No. 10-2016-0170107 filed on Dec. 14, 2016, the entire contents of which are incorporated herein by reference.

BACKGROUND

(a) Technical Field

The present disclosure relates to a brushless direct current electric motor (BLDC) driving control method and system for an electric water pump, and more particularly, to a BLDC electric motor driving control method for an electric water pump.

(b) Background Art

Generally, a cooling system provided in an automobile engine allows an operational temperature to be constantly maintained in the entire operation range of the engine. This system prevents deterioration of main components including the cylinder block, the headers and the pistons of the engine caused by heat of a high temperature of about 2,500° C., which is the maximum temperature generated in the combustion process of the mixer.

The cooling system of the engine includes a water pump that pumps cooling water cooled by the radiator to the jacket of the engine. Water pumps are broadly divided into a mechanical water pump and an electrical water pump. Typically electric water pumps are used to optimize control of engine cooling, reduce the engine load and improve the fuel efficiency of the vehicle while simplifying the structure around the engine.

In particular, the electric water pump transmits the rotational power of the impeller from an electric motor. The electric water pump includes an introduction port through which cooling water is introduced, a discharge port through which the cooling water is discharged, an impeller case having an impeller rotatably disposed therein to pump cooling water and a motor case coupled to a lower portion of the impeller case and having an electric motor disposed therein to rotate the impeller. In particular, a DC motor or a BLDC motor is used as the electric motor. The DC motor has a greater size than the BLDC motor and requires a separate sealing or bypass line to prevent infiltration of cooling water. Therefore, the BLDC motors, which are compact and optimized is size are mainly used.

However, to utilize the BLDC motor, a Hall sensor is required to detect the position of the rotor rotated at a high speed. In particular, a separate hardware component called a Hall sensor is required, thus causing an increase in material cost and may contribute to potential quality concerns.

The above information disclosed in this section is merely for enhancement of understanding of the background of the disclosure and therefore it may contain information that does not form the related art that is already known in this country to a person of ordinary skill in the art.

SUMMARY

The present disclosure provides a brushless direct current electric motor (BLDC) driving control method and system for an electric water pump configured to acquire the flux, angle, speed, and torque values through the voltage, current, motor and coil resistance and the inductance input value that may be converted using all three phases generated when the motor is driven and may use the acquired values for the electric water pump driving control. Accordingly, sensorless driving may be implemented while cost reduction may be achieved through elimination of the Hall sensor.

In an exemplary embodiment, the present disclosure provides a method of controlling driving of a brushless direct current electric motor (BLDC) of an electric water pump that may include estimating, by a controller, an initial position of a rotor based on a magnitude of a current detected in a three-phase coil wound on a stator, converting, by the controller, a current magnitude that reflects a rotational angle of the rotor with respect to the initial position into two direct currents based on the three-phase current and outputting, by the controller, the converted direct currents, acquiring a rotational angle, a speed, a flux and a torque of the rotor based on values of the three-phase current, a voltage generated based on flow of the three-phase current, a predetermined coil resistance, and an inductance input. Further, a speed of the motor may be adjusted based on the acquired rotational angle, speed, flux, and torque of the rotor.

In an exemplary embodiment, the method may further include comparing, by the controller, the acquired speed, flux and torque of the rotor based on a current rotational angle of the rotor with a predetermined speed, flux, and torque based on a change in rotational angle of the rotor. In another exemplary embodiment, the converting may include converting the three-phase current into a magnitude of a current generated in a three-phase coil of a stator and a magnitude of a current generated in a magnet of the rotor and outputting the magnitudes.

In still another exemplary embodiment, the acquiring may include acquiring the speed of the rotor based on an adjustment in the current rotational angle of the rotor with respect to the initial position. In an exemplary embodiment, the acquiring may further include adding the voltage generated based on the flow of the three-phase current to the speed of the rotor and acquiring the flux of the rotor. In still another exemplary embodiment, the acquiring may further include acquiring the torque of the rotor based on the rotational angle of the rotor and the speed of the rotor.

BRIEF DESCRIPTION OF THE DRAWINGS

The above and other features of the present disclosure will be more apparent from the following detailed description taken in conjunction with the accompanying drawings.

Figure 1:
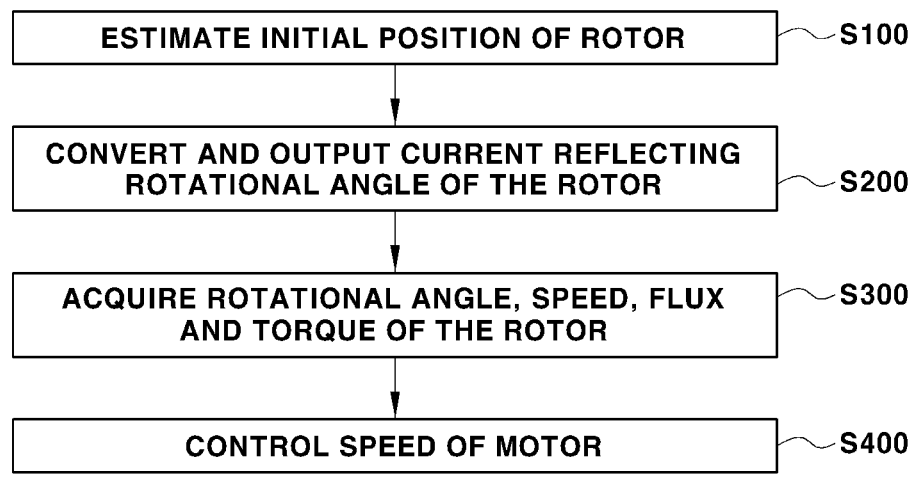
FIG. 1 is an exemplary embodiment of a BLDC electric motor driving control method for an electric water pump according to an exemplary embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment. In the figures, reference numbers refer to the same or equivalent parts of the present disclosure throughout the several figures of the drawing.

DETAILED DESCRIPTION

Hereinafter, the exemplary embodiments of the present disclosure will be described in detail with reference to the accompanying drawings to allow those skilled in the art to easily practice the present disclosure. Advantages and features of the present disclosure and methods for achieving the same will be clearly understood with reference to the following detailed description of embodiments in conjunction with the accompanying drawings.

However, the present disclosure is not limited to the exemplary embodiments disclosed herein, but may be implemented in various different forms. The exemplary embodiments are merely given to make the disclosure of the present disclosure be perfect and to perfectly instruct the scope of the disclosure to those skilled in the art, and the present disclosure should be defined by the scope of claims. In addition, in the description of the present disclosure, a detailed description of related known technologies and the like will be omitted when it is judged to make the subject of the present disclosure unclear.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 2:
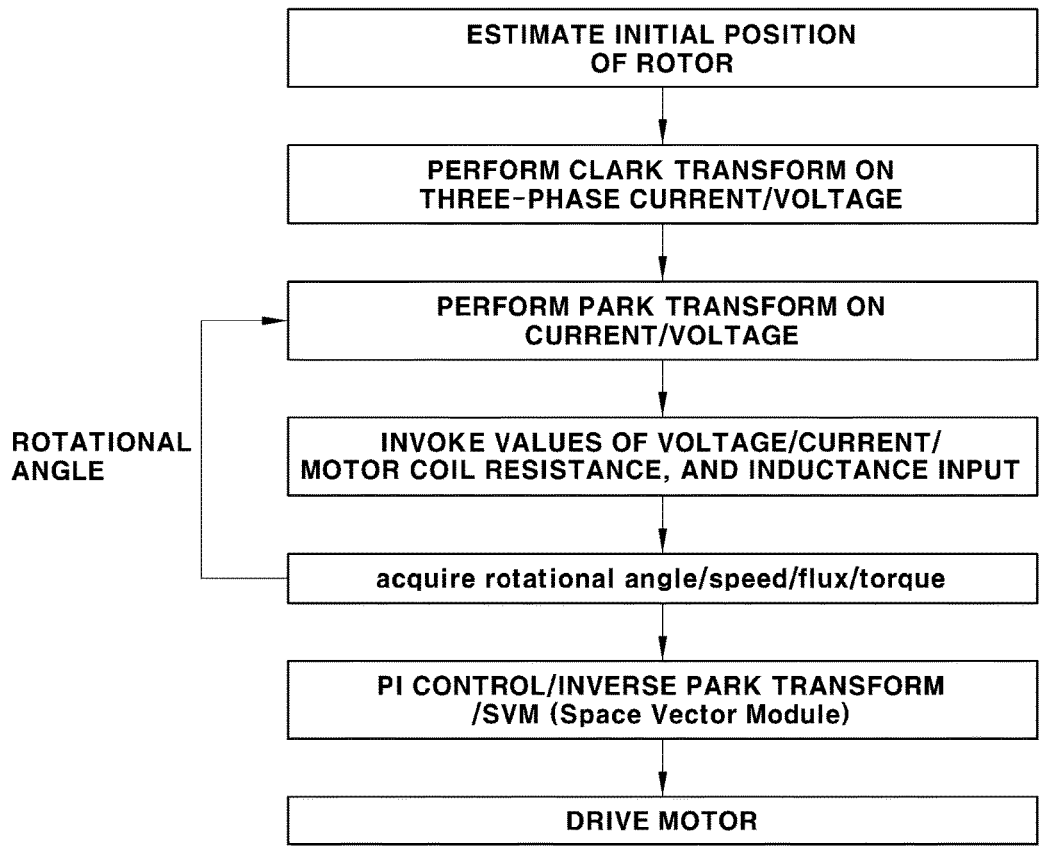
FIG. 2 is an exemplary embodiment of a control logic for a BLDC motor driving control method for an electric water pump according to an exemplary embodiment of the present disclosure.
Figure 3:
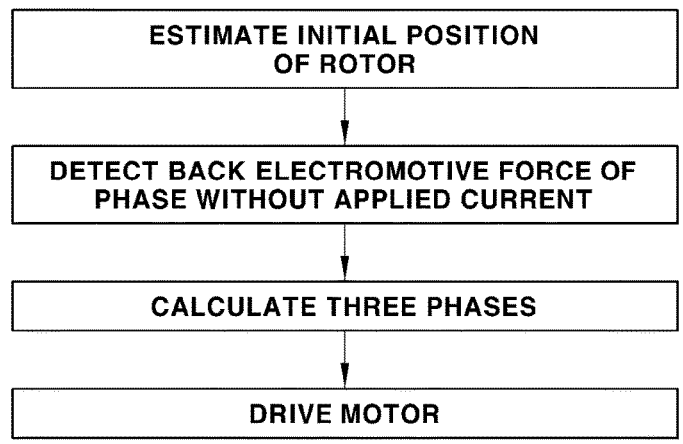
FIG. 3 is an exemplary embodiment of control logic for a BLDC motor driving control method for an electric water pump without a conventional Hall sensor.
Figure 4:
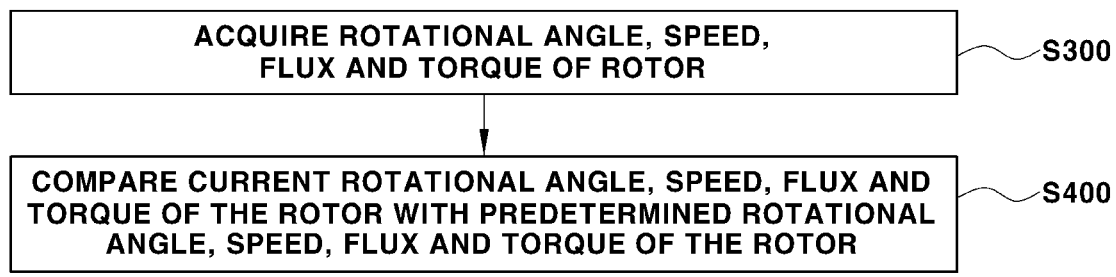
FIG. 4 is an exemplary embodiment of precise control for a BLDC motor driving control method for an electric water pump according to an exemplary embodiment of the present disclosure.

FIG. 1 shows an exemplary BLDC motor driving control method for an electric water pump according to an exemplary embodiment of the present disclosure. FIG. 2 shows a control logic for a BLDC motor driving control method for an electric water pump according to an exemplary embodiment of the present disclosure. FIG. 3 shows a control logic for a BLDC motor driving control method for an electric water pump without a conventional Hall sensor. FIG. 4 shows exemplary precise control for a BLDC motor driving control method for an electric water pump according to an exemplary embodiment of the present disclosure.

Hereinafter, a BLDC motor driving control method for an electric water pump will be described below in sequential order with reference to FIGS. 1 and 2. The initial position of the rotor is may be estimated based on the magnitude of the current detected in a three-phase coil wound on the stator (S100). Generally, to estimate the position of the rotor, a voltage divider may be configured to distribute the back electromotive force generated based on the three-phase current flowing to the u-phase, v-phase and w-phase coils of the three-phase BLDC motor, an analog-to-digital converter may be configured to convert the respective back electromotive forces distributed by the voltage divider to digital voltages and a digital low-pass filter may be configured to digitally integrate the output voltages of the analog-to-digital converter. Further, a phase delay compensator may be configured to compensate for the output signal phase of the digital low-pass filter such that to delay the phase by exactly 90° and a comparator may be configured to compare the output voltage of the compensator with the ground voltage and output a position estimation signal of the rotor of the three-phase BLDC motor.

Hereinafter, the estimation process of the initial position of the rotor will be described based on a rotor position estimating apparatus configured as above. First, the switching elements of an inverter unit may be selectively turned on and off based on a switching control signal to output a three-phase current. The output three-phase current may be applied to the u-phase, v-phase and w-phase coils wound on the stator of the three-phase BLDC motor configured to rotate the rotor. In addition, back electromotive force may be generated when the three-phase current flows through the u-phase, v-phase, and w-phase coils. The generated back electromotive force may be distributed by the voltage divider and then converted into digital back electromotive force by the analog-to-digital converter For example, the back electromotive force output from the analog-to-digital converter may be integrated in the digital low-pass filter to delay the phase by less than 90° and the phase delay of the output voltage of the digital low-pass filter may be compensated for by the phase delay compensator to delay the phase by 90°.

Finally, the integrated back electromotive force with a phase delayed by 90° by the digital low-pass filter and the phase delay compensator may be input to the comparator and may be compared with the ground level to detect a zero crossing. The zero crossing may be output as a rotor position estimation signal of the three-phase BLDC motor. Accordingly, the initial position of the rotor may be estimated. When the initial position of the rotor is output as described above, the output signal of the three-phase alternating current waveform output using the three-phase current may be converted into two direct currents and output (S200).

In other words, the magnitude of the current generated in the three-phase coil of the stator and the magnitude of the current generated in the magnet of the rotor may be converted by the controller, into output signals of the DC waveform based on the three-phase current. Accordingly, by recognizing the position information with respect to the initial position of the rotor, a current magnitude that reflects the rotational angle of the rotor may be output.

In an exemplary embodiment, the position information with respect to the initial position of the rotor may be determined based on the output signal of the three-phase alternating current (AC) waveform generated by performing Clark transform on the three-phase current/voltage as described above. In the related art, however, when the Hall sensor is eliminated as shown in FIG. 3, two of three phases are excited and then back electromotive force voltage of one phase which is not excited may be recognized in driving the motor. Then, the position information regarding the rotor is recognized by estimating the position information for the remaining two phases through calculation. For example, in the conventional control logic of the related art, the v phase is detected by adding 120° to the w phase, and the u phase is detected by subtracting 120° from the w phase. Thus, the position information regarding the rotor may be estimated and recognized through calculation of position information for these two phases.

However, in the conventional control method, the efficiency may be reduced and the torque ripple and vibration noise characteristics may be deteriorated since two phases are excited in driving the three-phase BLDC motor. Therefore, in this exemplary embodiment, the three phases are excited to address the above-described conventional issue.

Further, the rotational angle, speed, flux, and torque of the rotor are acquired based on the values of the three-phase current, a voltage generated according to flow of the three-phase current, a predetermined coil resistance, and an inductance input, respectively (S300). In particular, the three-phase current and voltage are values measured based on an adjustment in the value in the angle of the rotor. The coil resistance and the inductance input value are fixed to predetermined values based on the specifications of the motor.

For example, in acquiring the rotational angle, speed, flux and torque of the rotor through the three-phase current and voltage, the coil resistance, and the inductance input value, the RPM of the rotor may be acquired based on the change in the rotational angle with respect to the initial position of the rotor through the output signal of the DC waveform indicating the magnitude of current reflecting Park transform on the current-voltage shown in FIG. 2, namely, the rotational angle of the rotor. Then, the flux of the rotor may be calculated by adding the acquired speed to a voltage of the according to flow of the three-phase current, which is a voltage component that may be generated when the motor rotates. Further, the torque of the rotor may be acquired based on the rotational angle of the rotor and the speed of the rotor acquired as described above and changes as the speed of the rotor changes.

Accordingly, when the rotational angle of the rotor is changed, the current magnitude and voltage reflecting the angle of the rotor also may also change, and thus the speed, flux, and torque of the rotor are changed. In other words, the speed of the motor may be adjusted by a controller (e.g., PI controller, inverse Park transform, or space vector module (SVM)) using the speed, flux, and torque of the rotor acquired by an adjustment in the rotational angle of the rotor (S400). Accordingly, effective sensor-less driving may be performed. Therefore, in this exemplary embodiment, as the rotational angle, speed, flux, and torque of the rotor are calculated by calling the three-phase current and voltage, coil resistance, and inductance input value, and are used to adjust the speed of the motor, the Hall sensor, which has been conventionally employed, may be eliminated and thus cost reduction may be achieved.

In an exemplary embodiment, the predetermined speed, flux and torque according to change in the rotational angle of the rotor may be compared with the speed, flux and torque based on the current rotational angle of the rotor acquired in the above-described step S300, as shown in FIG. 4 (S500). The predetermined speed, flux and torque based on an adjustment in the rotational angle of the rotor may be stored in the controller as data. A problem caused during driving of the motor by comparing the data with the speed, flux and torque according to the current rotational angle of the rotor may be detected. In other words, when the flux according to the current rotational angle of the rotor is greater than a predetermined value, the voltage generated when the motor rotates may increase and cause motor overload. Accordingly, comparison with the predetermined values may be performed as described above to enable precise control according to driving of the motor. Accordingly, abnormality of the motor may be effectively recognized and potential quality problems of the motor may be eliminated.

The present disclosure provides a brushless direct current electric motor (BLDC) driving control method for an electric water pump that acquires flux, angle, speed and torque values through the voltage, current, motor coil resistance. The inductance input value may be converted based on the three phases generated when the motor is driven and may utilize the acquired values for electric water pump driving control. Accordingly, sensor-less driving may be achieved while costs may be reduced through elimination of the Hall sensor. In addition, since the present disclosure may effectively detect abnormality of the motor by comparing the flux, angle, speed and torque values with preset reference values, potential quality problem of the motor may be eliminated.

The disclosure has been described in detail with reference to exemplary embodiments thereof. However, it will be appreciated by those skilled in the art that changes may be made in these exemplary embodiments without departing from the principles and spirit of the disclosure, the scope of which is defined in the appended claims and their equivalents.

What is claimed is:

1. A method for controlling driving of a brushless direct current electric motor (BLDC) of an electric water pump, comprising the steps of:

estimating, by a controller, an initial position of a rotor based on a magnitude of a current detected in a three-phase coil wound on a stator;
converting, by the controller, a current magnitude that reflects a rotational angle of the rotor with respect to the initial position into two direct currents based on a three-phase current, and outputting the converted direct currents;
acquiring, by the controller, the rotational angle, a speed, a flux and a torque of the rotor based on values of the three-phase current, a voltage generated based on flow of the three-phase current, a predetermined coil resistance, and an inductance input; and
adjusting, by the controller, a speed of the motor based on the acquired rotational angle, speed, flux, and torque of the rotor,
wherein the acquiring step further comprises:
acquiring, by the controller, the speed of the rotor based on a change in the rotational angle of the rotor with respect to the initial position; and
acquiring, by the controller, the torque of the rotor based on the rotational angle of the rotor and the speed of the rotor.

2. The method of claim 1, further comprising:
comparing, by the controller, the acquired speed, flux and torque of the rotor based on the rotational angle of the rotor with a predetermined speed, flux, and torque based on a change in rotational angle of the rotor.

3. The method of claim 1, wherein the converting step further comprises:
converting, by the controller, the three-phase current into the magnitude of the current generated in the three-phase coil of the stator and a magnitude of a current generated in a magnet of the rotor and outputting the magnitudes.

4. The method of claim 1, wherein the acquiring step further comprises:
adding, by the controller, the voltage generated based on the flow of the three-phase current to the speed of the rotor and acquiring the flux of the rotor.

5. A system for controlling driving of a brushless direct current electric motor (BLDC) of an electric water pump, comprising:
a memory configured to store program instructions; and
a processor configured to execute the program instructions, the program instructions when executed configured to:
estimate an initial position of a rotor based on a magnitude of a current detected in a three-phase coil wound on a stator;
convert a current magnitude that reflects a rotational angle of the rotor with respect to the initial position into two direct currents based on a three-phase current, and output the converted direct currents;
acquire a rotational angle, a speed, a flux and a torque of the rotor based on values of the three-phase current, a voltage generated based on flow of the three-phase current, a predetermined coil resistance, and an inductance input; and
adjust a speed of the motor based on the acquired rotational angle, speed, flux, and torque of the rotor,
wherein the program instructions that, when executed, acquire the rotational angle, the speed, the flux and the torque of the rotor are further configured to:
acquire the speed of the rotor based on a change in the rotational angle of the rotor with respect to the initial position; and
acquire the torque of the rotor based on the rotational angle of the rotor and the speed of the rotor.

6. The system of claim 5, wherein the program instructions when executed are further configured to:
compare the acquired speed, flux and torque of the rotor based on the rotational angle of the rotor with a predetermined speed, flux, and torque based on a change in rotational angle of the rotor.

7. The system of claim 5, wherein the program instructions when executed are further configured to:
convert the three-phase current into the magnitude of the current generated in the three-phase coil of the stator and a magnitude of a current generated in a magnet of the rotor and outputting the magnitudes.

8. The system of claim 5, wherein the program instructions when executed are further configured to:
add the voltage generated based on the flow of the three-phase current to the speed of the rotor and acquiring the flux of the rotor.

9. A method for controlling driving of a brushless direct current electric motor (BLDC) of an electric water pump, comprising the steps of:
estimating, by a controller, an initial position of a rotor based on a current magnitude detected in a three-phase coil wound on a stator;
converting, by the controller, a current magnitude that reflects a rotational angle of the rotor with respect to the initial position into two direct currents based on a three-phase current, and outputting the converted direct currents;
acquiring, by the controller, the rotational angle, a speed, a flux and a torque of the rotor based on values of the three-phase current, a voltage generated based on flow of the three-phase current, a predetermined coil resistance, and an inductance input; and
adjusting, by the controller, a speed of the motor based on the acquired rotational angle, speed, flux, and torque of the rotor,
wherein the current magnitude generated in the three-phase coil wound on the stator and the current magnitude generated in a magnet of the rotor are converted, by a controller, into output signals of a DC waveform based on the three-phase current.

* * * * *